United States Patent [19]

Knapp

[11] Patent Number: 4,910,755
[45] Date of Patent: Mar. 20, 1990

[54] REGENERATOR/SYNCHRONIZER METHOD AND APPARATUS FOR MISSING-CLOCK TIMING MESSAGES

[76] Inventor: Stephen L. Knapp, 1776 Oakdale St., Pasadena, Calif. 91106

[21] Appl. No.: 310,825

[22] Filed: Feb. 14, 1989

[51] Int. Cl.⁴ .............................................. H03D 3/24
[52] U.S. Cl. .................................. 375/120; 328/155; 307/262
[58] Field of Search .................. 375/81, 82, 119, 120; 331/1 A, 25; 328/15, 24, 25, 134, 155; 307/262, 271, 510, 511

[56] References Cited

U.S. PATENT DOCUMENTS

| | | | |
|---|---|---|---|
| 2,847,565 | 8/1958 | Clapper | 328/120 |
| 4,133,978 | 1/1979 | Hewlett, Jr. | 370/101 |
| 4,574,243 | 3/1986 | Levine | 375/120 |
| 4,608,699 | 8/1986 | Batlivala et al. | 375/81 |
| 4,639,687 | 1/1987 | Scholz | 331/1 A |
| 4,654,859 | 3/1987 | Kung et al. | 331/1 A |
| 4,660,195 | 4/1987 | Hatabe | 370/92 |
| 4,733,197 | 3/1988 | Chow | 331/1 A |
| 4,756,025 | 7/1988 | Munz et al. | 375/111 |
| 4,780,759 | 10/1988 | Matsushima et al. | 375/120 |
| 4,803,680 | 2/1989 | Rokugio et al. | 370/102 |

Primary Examiner—Robert L. Griffin
Assistant Examiner—Stephen Chin

[57] ABSTRACT

In a bit-serial type data transmission system using the interruption of clock pulses in the timing message to identify separate data word groups in the data messages, a method and apparatus for recovering the transmitter clock oscillator frequency and thereby identifying the interruption interval. The method and apparatus in addition provide signals which may be employed to control the reception of the serial data word groups, to indicate the availability of the data groups as bit-parallel words, and to provide for the retransmission of the received data word groups or the transmission of other word groups.

18 Claims, 5 Drawing Sheets

REGENERATOR/SYNCHRONIZER METHOD AND APPARATUS FOR MISSING-CLOCK TIMING MESSAGES

BACKGROUND: FIELD OF THE INVENTION

This invention relates generally to improved communication systems and methods involving high performance serial transmission of data messages, and, in particular, to techniques for detecting, repeating, and utilizing the associated timing messages when such timing messages employ omitted clock pulses to effect data message synchronization.

In recent years there has arisen a demand for high performance digital data transmission techniques, especially in the fields of information processing, scientific instrumentation, and remote operation of instruments or machines. By "high performance" is meant communication at sufficiently high data rates and over distances sufficiently great that the physical properties of the transmission lines become determining factors in the maximum data transfer speed permissible with insignificant error rate. Over very long distances, the transmitted messages may become degraded because of the physical properties of the transmission medium, and in such situations it may be necessary and desireable to introduce repeating stations in order to maintain the performance level.

BACKGROUND: CROSS-REFERENCE TO RELATED APPLICATION

The following patent application is related to this application:
Title: Simple, High Performance Digital Data Transmission System and Method
Inventor: Stephen L. Knapp
Ser. No.: 07/170,551 (now U.S. Pat. No. 4,841,549)
Filed: Mar. 21, 1988

BACKGROUND: DISCUSSION OF PRIOR ART

The following terms are used in this document. In a one directional transmission system, the messages begin at a "transmitting station" or "originating station" and ultimately arrive at a "receiving station" or "destination station". Repeating stations may be used between the originating and destination stations. In a bi-directional system, the nearby station is regarded as the "master station", and the distant station is regarded as the "remote station". The remote station is normally under the control of the master station, especially in cases of remote operation of machines. Bi-directional repeating stations may be used between the master and the remote stations. By "channel" is meant any transmission path for a single (that is, non-multiplexed) stream of serial binary information. Examples of such paths are coaxial cable, twisted pair cable, non-multiplexed fiber optic cable, microwave link, etc. Several channels may be multiplexed on one path, however, as in the case of multiple polarizations and/or wavelength bands transmitted on a single fiber optic cable.

When the transmission distance is sufficiently great that the propagation time is comparable to or greater than the data rate, it is desireable for best performance to employ "asynchronous" timing of the data transfer, wherein the destination station uses timing messages produced at the originating station to capture the data messages. A simple method of high performance data transmission from a transmitting station to a receiving station separated by a distance of several kilometers or more has been disclosed in a copending application, Ser. No. 07/170,551, filed by Knapp, Mar. 21, 1988 [hereinafter referred to as Ref. (A)]. In the method of Ref. (A) the timing messages are sent over a dedicated timing message channel, and the digital data are sent over one or more data message channels with propagation length nearly identical to that of the timing channel. The data message bits are grouped into "words" and are transmitted sequentially on the data channels along with simultaneous timing clocks on the timing channel. The word groups are separated and synchronized by means of the interruption of the timing clocks.

According to Ref. (A), the rate of the timing clocks, and therefore the data bit rate, may be varied if desired over some range by means of an adjustable oscillator at the transmitting station. Similarly, the duration over which the timing clocks are interrupted may be chosen to best suit the requirements of the specific case. As discussed in Ref. (A), the interruption usually specific case. As discussed in Ref. (A), the interruption usually is for an interval of one or a few timing clock cycles, although non-integral intervals may be used.

In the technique of Ref. (A) a technique is disclosed for detecting at the destination station the absence of one or more timing clocks and for synchronizing thereby the final capture of the data word groups. That technique, called a "missing pulse detector", is simple and inexpensive, being based upon a retriggerable multivibrator. However, that technique provides only moderate compliance with respect to timing clock frequency.

Furthermore, the earlier technique is not best suited to those stations which are required to perform on the incoming data messages certain time-critical operations, such as those which depend on the content of the data messages. One such time-critical circumstance can occur when a repeating station is expected to interrogate the data. Another such time-critical circumstance will occur in bi-directional systems where station integrity may be checked by "loop-back" techniques, in which data bit patterns are retransmitted upon command back to the master station. Because the frequency of the interrupted clock may be varied at the master station, it is preferable to employ timing recovery methods at subsequent stations to determine the clock frequency of the transmitting station so that the retransmission of data words be properly synchronized.

In addition, also in bi-directional systems, it is desirable to employ the received timing clock messages as sources of the timing messages for transmitting return data messages, in order to keep the bit rates commensurate in both directions. Such return messages may be data messages produced by machinery or instrumentation connected to the remote station or may be loop-back check messages. In all such cases (loop-back or remote messages) of data transmission, synchronizing signals must be derived from the timing messages when the clocks are interrupted and when they are resumed.

SUMMARY OF THE INVENTION

In accordance with the present invention, knowledge of the fractional number of absent clock pulses in the timing messages permits the use of a timing recovery circuit in a receiving or repeating station to regenerate the timing clock oscillator frequency at the originating station.

It is an advantage of such a timing recovery circuit that it is successful typically over a broad range of incoming clock frequencies. This permits the clock frequency to be adjusted in a simple way at the transmitting station only in order to obtain highest overall system performance.

Also in accordance with the present invention, the comparison of clocks derived from the regenerated oscillator frequency with the received timing messages permits a signal generator circuit to respond to the interval of missing clocks more accurately than a prior method. The signal generator circuit also provides clock and control signals which facilitate the reception and transmission of data words in serial data transmission systems which employ interrupted clocks to identify the separation between successive words.

DESCRIPTION OF PREFERRED EMBODIMENTS

Figure 1:
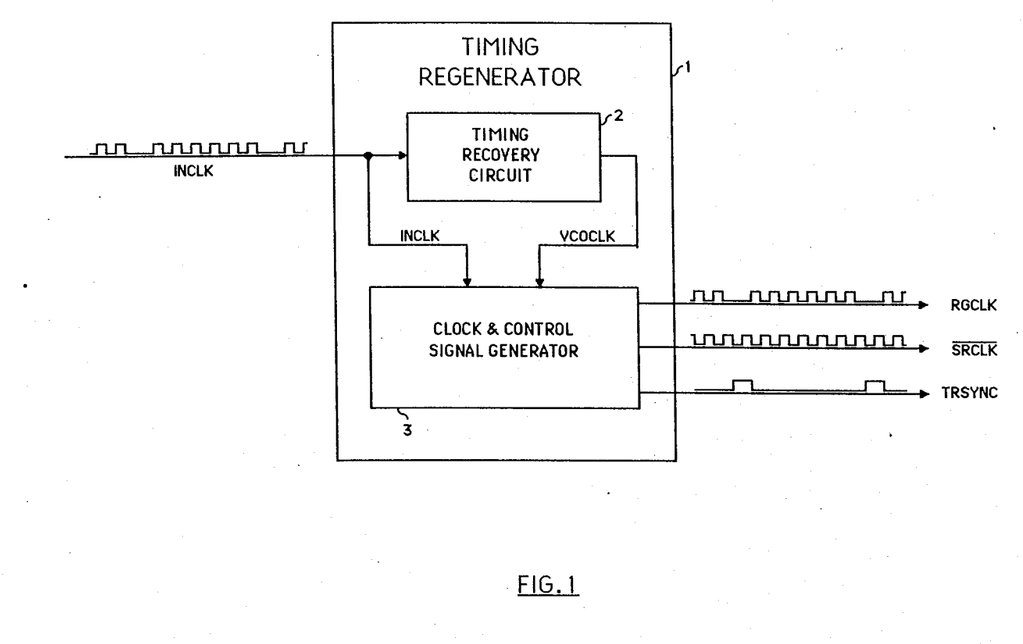
FIG. 1 is an overall block and electrical diagram generally illustrating a timing regenerator apparatus connected to an interrupted clock timing message channel and containing a timing recovery circuit and a clock and control signal generator in accordance with the present invention.

Reference is directed initially to FIG. 1, which is an overall block and electrical diagram generally illustrating the timing regenerator apparatus 1 connected to an interrupted clock timing message channel containing the timing signal INCLK. As shown in FIG. 1 the timing signal INCLK consists of intervals of periodic clock pulses alternated with intervals of no pulses. In the data transmission method of copending application Ser. No. 07/170,551, filed by Knapp, Mar. 21, 1988 [Ref. (A)], data signals grouped into words are incoming on one or more separate data channels in synchronism with the clock pulses contained in INCLK. According to Ref. (A), the timing of the incoming clock and data signals are determined in a transmitting subsystem according to an oscillator which may be adjusted over some range.

The timing regenerator apparatus 1 contains timing recovery circuit 2 and clock and control signal generator 3. The input to timing recovery circuit 2, which in the embodiments of this application is a phase-locked loop, is INCLK. As will be explained below, the output of circuit 2 is a periodic signal, VCOCLK, which is equal in frequency to that of the oscillator associated with the transmitting subsystem used to produce the sequence of interrupted clocks in INCLK.

The timing regenerator apparatus 1 also contains clock and control signal generator 3, which has as inputs INCLK and VCOCLK. In the embodiments of this application, generator 3 has three primary output signals, RGCLK, $\overline{\text{SRCLK}}$, and TRSYNC, which may be used variously in the capture of incoming data words, in the retransmission of captured data words, and in the transmission of new data words. The signal RGCLK is a replica of the signal INCLK with a time delay. The signal $\overline{\text{SRCLK}}$ contains an uninterrupted series of clock pulses equal in frequency to the clocks in RGCLK and constrained at each resumption of the clocks in RGCLK to be out of phase with RGCLK. The signal TRSYNC changes state in response to the interruption of the clocks in INCLK and in response to their resumption. The periodic signal VCOCLK may also be provided as an output signal of the timing regenerator apparatus 1.

As will be seen in the discussion which follows, timing recovery circuit 2 and signal generator 3 in some practical embodiments may be closely combined functionally so that they may not always be separable.

As discussed in Ref. (A), a sequence of N clocks is followed by an interrupted-clock interval in length at least long enough to be recognized by the timing recovery apparatus in a receiving station. Let the duration of this interrupted-clock interval be defined as equal to m cycles of the oscillator in some transmitting apparatus, where m is a positive integer. Let the duration of each of the N clocks be defined as equal to k cycles of the same transmitter oscillator, where k is also a positive integer. These conditions will normally prevail in a digital transmitting system. Evidently, the duration of the clock-containing interval in the signal INCLK is kN cycles of the transmitting oscillator, and the total duration in INCLK between the start of successive word groups is $kN+m$ cycles of the transmitting oscillator.

Figure 2:
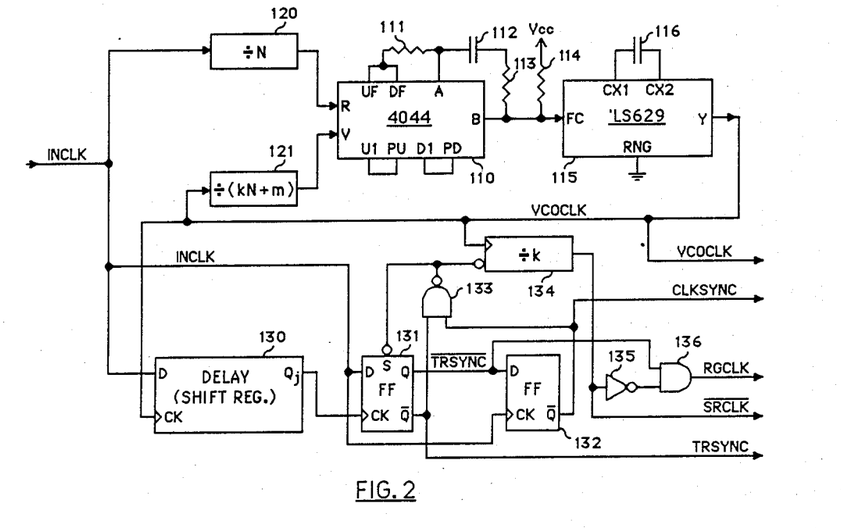
FIG. 2 is an electrical diagram illustrating in greater detail an embodiment of the timing recovery circuit and signal generator of FIG. 1 for the general case of N data bit clocks per data word.
Figure 3:
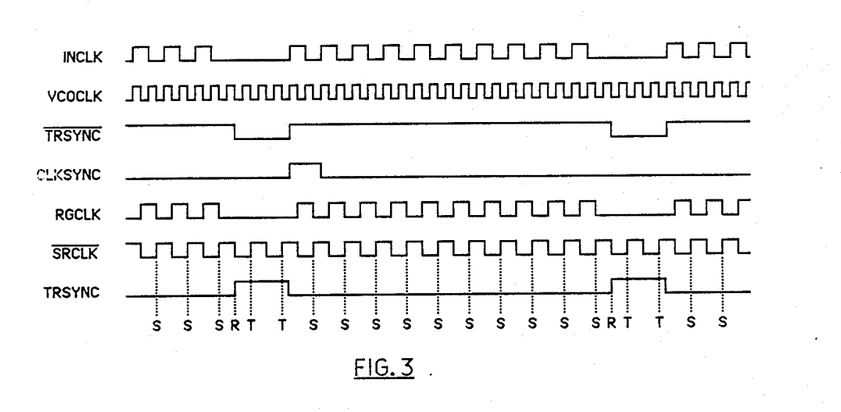
FIG. 3 is a series of graphs illustrating the operation of the apparatus of FIG. 2 for the particular case $N=10$, $k=2$, $m=4$.

An embodiment of the general case of the timing regenerator apparatus 1 is shown in FIG. 2, which may be better understood by reference to FIG. 3, which is a timing diagram for the signals of FIG. 2. Elements 110, 115, 120, and 121 are connected together as a phase-locked loop and form the timing recovery circuit 2. Element 110 is an integrated circuit (IC) containing a phase-frequency detector, a charge pump, and an amplifier, similar to Motorola type MC4044. This IC is connected in this example as a zero phase and frequency detector, with temporal characteristics set by resistors 111 and 113 and by capacitor 112; element 114 is a load resistor for the amplifier. The output of the amplifier is connected to the frequency control input of adjustable oscillator 115, of which the output frequency range is governed by timing capacitor 116 and various range input terminals. In this embodiment 115 is a voltage controlled oscillator (VCO) of type 74LS629, and provides an output frequency signal VCOCLK. The incoming timing message signal INCLK is connected to the input to the modulo N divider circuit 120; the output of 120 is connected to the reference input of the phase-frequency detector 110. The output of oscillator 115 is connected to the input to the modulo $(kN+m)$ divider circuit 121; the output of 121 is connected to the variable input of the phase-frequency detector 110. Proper timing recovery occurs when the VCO operates at that frequency when $(kN+m)$ cycles of VCOCLK take place during the time when N cycles of the interrupted clock INCLK take place. The signal VCOCLK is available as an output of timing regenerator 1, as shown in FIG. 2.

Continued examination of FIGS. 2 and 3 will show that elements 130 through 136 comprise the signal generator 3. Elements 130 and 131 serve to detect the occurrence of the interrupted-clock interval. Element 130 is a delay line used to delay INCLK by at least one cycle; a useful digital method is to use a shift register clocked by VCOCLK with sufficient stages (for example k or k+1) to account for variations in the capture characteristics of timing recovery circuit 2. Initially set, so that $\overline{TRSYNC}$ is high, D flip-flop 131 will be reset by the first "missing clock" in INCLK. Thus the signal TRSYNC goes high in response to the occurrence of the interrupted-clock interval. D flip-flop 132, being clocked by INCLK and with D input $\overline{TRSYNC}$, detects the resumption of the previously interrupted clocks; output CLKSYNC goes high at the start of the clock-containing interval. When CLKSYNC goes high, gate 133 connected to TRSYNC and CLKSYNC provides a reset signal at the start of the clock-containing interval. This reset signal is used to set flip-flop 131 with the consequence that TRSYNC goes low when the timing clocks in INCLK resume. Modulo k divider 134 is used to provide from VCOCLK a continuous clock signal $\overline{SRCLK}$ with period equal to that of the clocks in INCLK. The aforementioned reset signal provided by gate 133 is applied to reset input of divider 134. The clock and reset inputs and the output to divider 134 are configured in such a way that the last transition of $\overline{SRCLK}$ prior to the fall of TRSYNC is from low to high, as shown in FIG. 3. Invertor 135 and gate 136 are employed to produce a signal RGCLK replicating the original timing signal INCLK, but delayed as shown in FIG. 3; the phase of RGCLK is opposite to that of $\overline{SRCLK}$.

Figure 4:
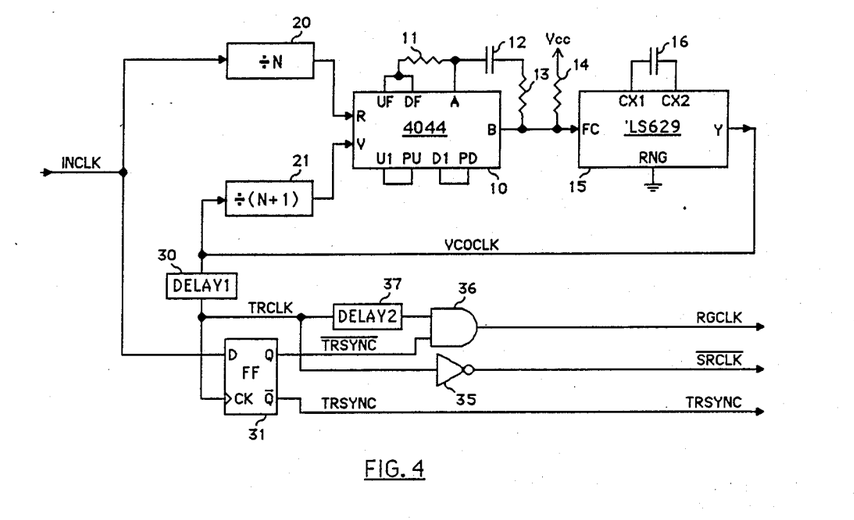
FIG. 4 is an electrical diagram illustrating in greater detail an embodiment of the timing recovery circuit and signal generator of FIG. 1 for the specific case of N data bit clocks per data word and $m=1$ and $k=1$.

An especially practical case of the invention obtains when the interrupted-clock interval is exactly one cycle of the timing message clock, and in this circumstance the previous general case simplifies to k=1 and m=1. An advantageous embodiment of the invention when exactly one clock is omitted is shown in FIG. 4. FIG. 4 may be more readily understood with reference to FIG. 5 which is a timing diagram for the signals of FIG. 4. Elements 10 through 16 correspond closely to the respective elements 110 through 116 of FIG. 2. They form the phase-frequency detector and variable oscillator sections of the phase-locked loop timing recovery circuit 2. Divider 20 is identical to divider 120. In the case of k=1 and m=1, however, divider 121 simplifies to the modulo N+1 divider 21 of FIG. 4. Because the interrupted-clock interval in this embodiment is the time for an exact integer number of timing message clocks, the phase-locked loop does not employ frequency multiplication; the multiplier is unity (k=1). In other respects the operation of this embodiment of the timing recovery circuit is the same as the previous general case.

The timing recovery circuits shown in FIGS. 2 and 4 have been demonstrated experimentally to operate correctly over a range in frequency of more than double, for a variety of values for integer N, and, in the case of the circuits in FIG. 2, in addition over a variety of values for integers m and k.

Figure 5:
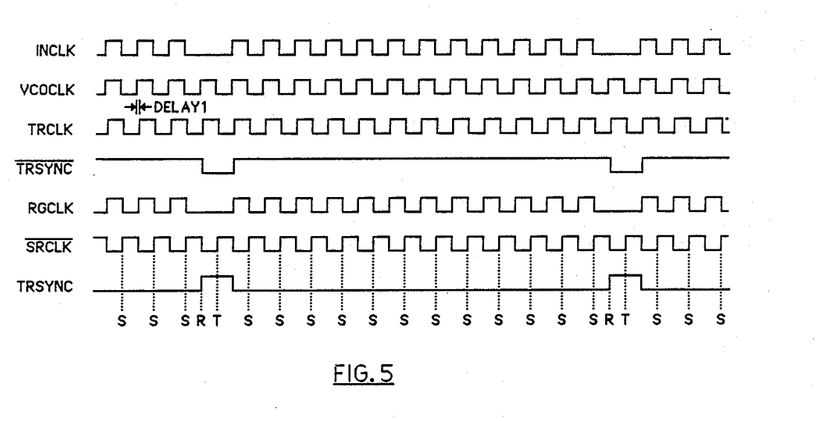
FIG. 5 is a series of graphs illustrating the operation of the apparatus of FIG. 4 for the particular case $N=12$, $k=1$, $m=1$.

The preferred embodiment of the signal generator 3 in this simple case of k=1 and m=1 takes a less complicated form, however, as may be seen from FIG. 4; FIG. 5 is a timing diagram for the signals of FIG. 4. The output signal from the timing recovery circuit, VCOCLK, is approximately in phase with the clocks in the incoming timing message, INCLK, VCOCLK is applied to delay device 30, which has output signal TRCLK; TRCLK is signal VCOCLK delayed by time delay DELAY1. Flip-flop 31, triggered by TRCLK, serves to sample INCLK just after the start time of each expected clock. Hence the output signal TRSYNC of flip-flop 31 detects the occurrences of each alternate interval in INCLK, as shown in FIG. 5. $\overline{TRSYNC}$, the other output signal of flip-flop 31, and TRCLK, after a further small time delay, DELAY2, provided by delay device 37 to allow for the propagation delay through flip-flop 31, are gated by element 36 to produce output signal RGCLK. The continuous clock $\overline{SRCLK}$ is obtained from TRCLK after inversion by invertor 35. The three signals, RGCLK, $\overline{SRCLK}$, and TRSYNC, each include the time delay, DELAY1, created by element 30, as may be seen from FIG. 5.

Figure 6:
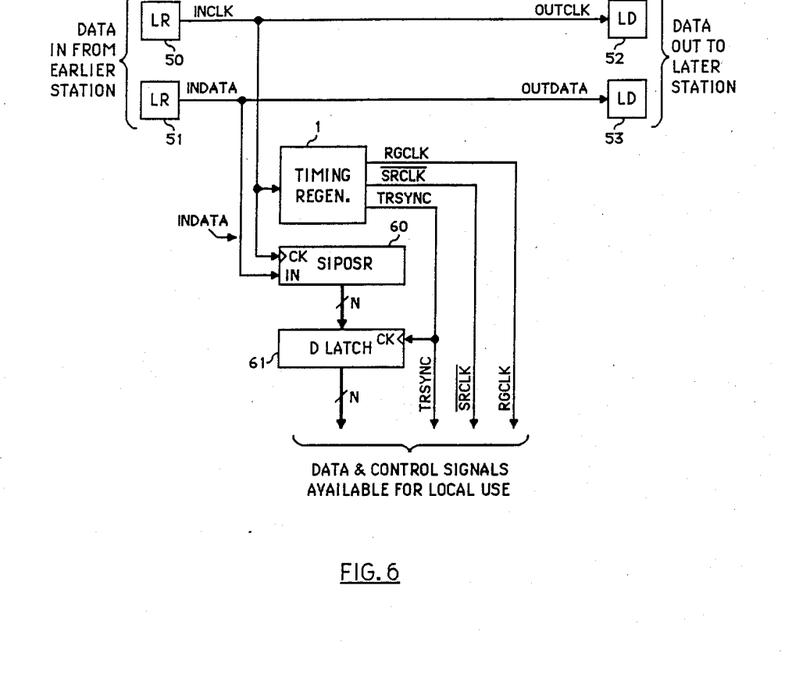
FIG. 6 is a block and electrical diagram illustrating an example of the use of the timing regenerator of FIG. 1 in a repeating station.

The signal TRSYNC, which goes high in response to the occurrence of the interrupted clock interval, may be employed functionally in a data transmission system to capture an incoming data word and to signal the reception of the word. Such a data transmission system is described in Ref. (A). An example of this function is shown in FIG. 6, which shows the use of the timing regenerator apparatus 1 in a repeating station with access to the data. The incoming timing message signal, INCLK, and an incoming serial data message signal, INDATA, arrive as outputs of line receivers 50 and 51, respectively. These signals, renamed OUTCLK and OUTDATA, are retransmitted to a later station by line drivers 52 and 53, respectively. INCLK is connected also to the input to timing regenerator 1 and to the clock input of serial-in parallel-out shift register (SIPOSR) 60, which contains at least as many stage as the N bits of the data word. INDATA is connected also to the serial data input to SIPOSR 60, so that the data word bits are shifted along the stages of the SIPOSR 60. The parallel data output signals from the SIPOSR are connected to the data inputs of D-type register/latch 61 of at least N bits. Since TRSYNC is connected to the clock input of register 61, when TRSYNC goes high at the completion of the transmission of each N bit word, register 61 stores that data word. The data word is available as the output bits from the register until the next word is stored in 61.

Figure 7:
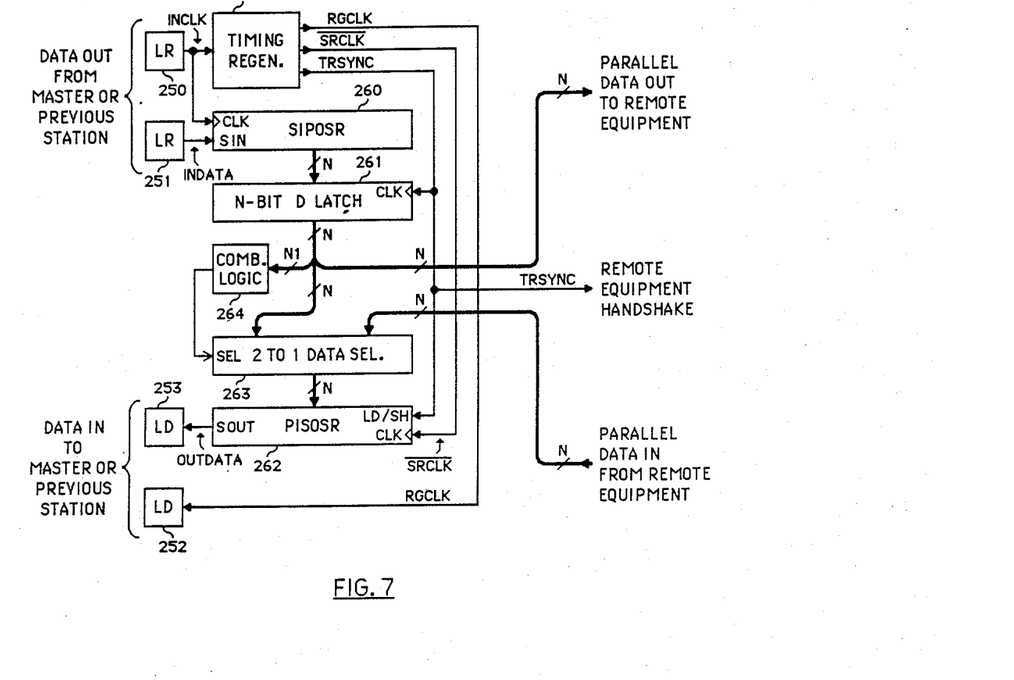
FIG. 7 is a block and electrical diagram illustrating an example of the use of the timing regenerator of FIG. 1 in a bidirectional remote station.

Reference is now made to FIG. 7, which shows an example of use of the invention in a remote station with bi-directional capability. The timing regenerator apparatus is element 1. Elements 250, 251, 260, and 261 are functionally and operationally identical to elements 50, 51, 60, and 61 of FIG. 6, respectively. After each rising edge of TRSYNC a new N-bit data word is present at the output terminals of register/latch 261. This data word is made available to external remote equipment and to one set of input terminals of N-bit 2 to 1 data selector 263. A N-bit data word output from the external remote equipment is connected to the other set of input terminals of data selector 263. Some number, N1, of bits from the output word from register/latch 261 is input to combinational logic device 264. The output signal from device 264 is connected to the select input of data selector 263, and determines which N-bit input word appears at the parallel output terminals of data selector 263. This N-bit word output from 263 is connected to the parallel input terminals of parallel-in serial-out shift register (PISOSR) 262. The serial output signal, OUTDATA, of PISOSR 262 is connected to line driver 253. Signals TRSYNC and $\overline{\text{SRCLK}}$ from regenerator 1 are connected respectively to the LOAD/SHIFT and clock inputs of PISOSR 262. PISOSR 262 is of the common clock configuration, such as type 74LS1166, which either performs a broadside load or shifts data by one bit at the clock edge, depending on the state of the LOAD/SHIFT input; a PISOSR with other load/shift configurations, for example 74LS165, may be employed if suitable signals are generated from TRSYNC and $\overline{\text{SRCLK}}$. Signal RGCLK from timing regenerator apparatus 1 is connected to line driver 252.

Reference to timing relationships shown in FIGS. 3 and 5 may be helpful in understanding the following discussion of the operation of the remote station shown in FIG. 7. Data reception at the remote station is continuous as just described, with a new word from the master station presented to the remote equipment with each rise in TRSYNC. Data transmission from the remote station toward the master station is accomplished using signals OUTDATA and RGCLK, which correspond in nature to INDATA and INCLK respectively at the return input to the master station, with RGCLK containing the timing messages and OUTDATA containing the data messages. The return data message words are derived either from the output words available at the output terminals of register/latch 261 or from the parallel data word input from the external equipment, depending on the output of the combinational logic circuit 264 as controlled by the N1 bits from the master station. This selection occurs as soon after the received data word is latched by the rise of TRSYNC as allowed by the propagation delays in 264 and 263. At the subsequent rise of $\overline{\text{SRCLK}}$, denoted by the letters "T" in FIGS. 3 and 5, the data word which has been selected by 263 according to the output of 264 is loaded into PISOSR 262; this may occur more than once if, as in the case of FIG. 3, the interval without clock is longer than one clock period. After PISOSR 262 has been loaded, TRSYNC goes low, allowing the PISOSR 262 to shift data according to input $\overline{\text{SRCLK}}$. The data are shifted at subsequent rises in $\overline{\text{SRCLK}}$, as denoted in FIGS. 3 and 5 by the letters "S".

In the examples shown in this application, the invention is shown at a repeater or remote station (a) to provide for the recovery of the oscillator frequency associated with the transmitter at the master station; (b) to provide control and timing signals to enable the timely reception or capture of the data words from the master station; and (c) to provide control and timing signals for transmission of data words at the same timing characteristics as received from the master station.

Although this description has primarily been directed to particular preferred embodiments of the invention, it will be understood that many modifications and variations in construction, arrangement, and use are possible without departing from the true spirit of the present invention. The present invention is accordingly to be considered as including all modifications and variations coming within the scope of the appended claims.

What is claimed is:

1. In a system using a transmission channel means for carrying sequential timing messages from a transmitting station to a receiving station, wherein said timing messages each consist of an interval containing N cycles of a clock, each of said cycles of a clock being of duration equal to k cycles of an oscillator associated with the transmitting station, and an interval without clock, said interval without clocks being of duration equal to m cycles of said oscillator associated with the transmitting station, where N, k, and m are positive integers, a timing recovery apparatus connected to said transmission channel means and comprising:
   a phase-frequency detector circuit;
   a variable oscillator with at least one frequency control input;
   a modulo N divider circuit, with input connected to said transmission channel means and with output connected to one input of said phase-frequency detector circuit;
   a modulo (kN+m) divider circuit, with input connected to the output of said variable oscillator and with output connected to another input of said phase-frequency detector circuit;
   the output of said phase-frequency detector circuit being connected to the frequency control input of said variable oscillator so as to cause said variable oscillator to operate at the frequency of said oscillator associated with the transmitting station.

2. The timing recovery apparatus of claim 1 which further comprises:
   means for providing an output signal with a frequency equal to that of said variable oscillator.

3. The timing recovery apparatus of claim 1 which further comprises:
   means for providing an output signal with a frequency equal to that of said variable oscillator divided by said integer k.

4. The timing recovery apparatus of claim 1 which further comprises:
   means for detecting the occurrence of said interval without clocks.

5. The timing recovery apparatus of claim 4 wherein:
   said means for detecting the occurrence of said interval without clocks includes means for providing an output signal which changes state in response to the beginning of said interval without clocks, whereby an external device may be signalled that the interval without clocks has commenced.

6. The timing recovery apparatus of claim 5 wherein:
   said means for detecting the occurrence of said interval without clocks includes means for providing an output signal which changes state in response to the beginning of the interval containing clocks, whereby an external device may be signalled that said interval without clocks has ended.

7. The timing recovery apparatus of claim 6 which further comprises:
   means for providing an output signal with a frequency equal to that of said variable oscillator divided by said integer k.

8. The timing recovery apparatus of claim 4 wherein:
   said means for detecting the occurrence of said interval without clocks includes means for providing an output signal which changes from a first state to a second state in response to the beginning of said interval without clocks and from said second state to said first state in response to the beginning of the interval containing clocks, whereby an external device may be signalled in response to the beginnings of each of said intervals.

9. The timing recovery apparatus of claim 8 which further comprises:

means for providing an output signal with a frequency equal to that of said variable oscillator divided by said integer k.

10. A timing recovery method for use in a system using a transmission channel means for carrying sequential timing messages from a transmitting station to a receiving station, wherein each timing message consists of:

an interval containing N cycles of a clock, each of said cycles of a clock being of duration equal to k cycles of an oscillator associated with the transmitting station, N and k being positive integers; and an interval without clocks, said interval without clocks being of duration equal to m cycles of said oscillator associated with the transmitting station, m being a positive integer;

said timing recovery method comprising the steps of:

providing a phase-frequency detector circuit;

providing a variable oscillator with at least one frequency control input;

providing a modulo N divider circuit, with input connected to said transmission channel means and with output connected to one input of said phase-frequency detector circuit;

providing a modulo (kN+m) divider circuit, with input connected to the output of said variable oscillator and with output connected to another input of said phase-frequency detector circuit;

and connecting the output of said phase-frequency detector circuit to the frequency control input of said variable oscillator so as to cause said variable oscillator to operate at the frequency of said oscillator associated with the transmitting station.

11. The timing recovery method of claim 10 which further comprises the step of:

providing an output signal with a frequency equal to that of said variable oscillator.

12. The timing recovery method of claim 10 which further comprises the step of:

providing an output signal with a frequency equal to that of said variable oscillator divided by said integer k.

13. The timing recovery method of claim 10 which further comprises the step of:

providing means for detecting the occurrence of said interval without clocks.

14. The timing recovery method of claim 13 whereby:

the step of providing said means for detecting the occurrence of said interval without clocks includes means for providing an output signal which changes state in response to the beginning of said interval without clocks, whereby an external device may be signalled that the interval without clocks has commenced.

15. The timing recovery method of claim 14 whereby:

the step of providing said means for detecting the occurrence of said interval without clocks includes means for providing an output signal which changes state at the beginning of the interval containing clocks, whereby an external device may be signalled that said interval without clocks has ended.

16. The timing recovery method of claim 15 which further comprises the step of:

providing an output signal with a frequency equal to that of said variable oscillator divided by said integer k.

17. The timing recovery method of claim 13 whereby:

the step of providing said means for detecting the occurrence of said interval without clocks includes means for providing an output signal which changes from a first state to a second state in response to the beginning of said interval without clocks and from said second state of said first state in response to the beginning of the interval containing clocks, whereby an external device may be signalled in response to the beginnings of each of said intervals.

18. The timing recovery method of claim 17 which further comprises the step of:

providing an output signal with a frequency equal to that of said variable oscillator divided by said integer k.

* * * * *